(12) United States Patent
Kabata et al.

(10) Patent No.: US 8,076,805 B2
(45) Date of Patent: Dec. 13, 2011

(54) ROTATING ELECTRIC MACHINE WITH ROTOR COOLING SLOTS

(75) Inventors: Yasuo Kabata, Yokohama (JP); Masafumi Fujita, Yokohama (JP); Mikio Takabatake, Yokohama (JP); Hitoshi Katayama, Yokohama (JP); Mikio Kakiuchi, Yokohama (JP); Koji Matsuyama, Yokohama (JP); Yoshiyuki Shimoda, Fukushima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 365 days.

(21) Appl. No.: 12/057,592

(22) Filed: Mar. 28, 2008

(65) Prior Publication Data

US 2008/0252156 A1    Oct. 16, 2008

(30) Foreign Application Priority Data

Mar. 29, 2007  (JP) ................ P2007-089053

(51) Int. Cl.
*H02K 9/00* (2006.01)
(52) U.S. Cl. .................... 310/61; 310/216.069
(58) Field of Classification Search .......... 310/61, 310/52, 58, 59, 216.069
See application file for complete search history.

(56) References Cited

U.S. PATENT DOCUMENTS

| | | | |
|---|---|---|---|
| 4,315,172 A * | 2/1982 | Intichar et al. ............. | 310/53 |
| 4,922,147 A * | 5/1990 | Sismour et al. ............ | 310/61 |
| 5,929,550 A * | 7/1999 | Kaminski et al. .......... | 310/214 |
| 6,204,580 B1 * | 3/2001 | Kazmierczak ............. | 310/52 |

FOREIGN PATENT DOCUMENTS

| | | |
|---|---|---|
| GB | 724875 | 2/1955 |
| JP | 57-78351 | 5/1982 |
| JP | 58-116042 | 7/1983 |
| JP | 58-145056 | 9/1983 |
| JP | 59-132740 | 7/1984 |
| JP | 64-1437 | 1/1989 |
| JP | 11-150898 | 6/1999 |
| JP | 2001-178050 | 6/2001 |
| JP | 2001-258190 | 9/2001 |

* cited by examiner

*Primary Examiner* — Tran Nguyen
*Assistant Examiner* — Naishadh Desai
(74) *Attorney, Agent, or Firm* — Oblon, Spivak, McClelland, Maier & Neustadt, L.L.P.

(57) ABSTRACT

A rotor of a rotating electric machine includes a cylindrical rotor core, a plurality of coil slots provided on an outer periphery of the rotor core along a rotor axis direction, rotor coils disposed in the coil slots by laminating a plurality of field conductors through an insulation material, a rotor wedge disposed at an opening end portion of the coil slot so as to support the rotor coil, a coil ventilation duct formed in the coil slot so as to pass through the rotor coils, the rotor wedge and the insulation material, and sub-slots provided at bottom portions of the coil slots so as to be communicated with rotor core ends and the coil ventilation ducts. In such a rotor of a rotating electric machine, the coil slot, the sub-slots and the coil ventilation duct constitute a cooling gas channel for distributing a cooling gas to thereby cool the rotor coils. A depth in a diameter direction of each sub-slot from the rotor coil end to a nearest coil ventilation duct is larger than a depth of the sub-slot at a portion near a center of the rotor core.

9 Claims, 7 Drawing Sheets

ROTATING ELECTRIC MACHINE WITH ROTOR COOLING SLOTS

BACKGROUND OF THE INVENTION

1. Field of the Invention

The present invention relates to a rotating electric machine particularly provided with an improved rotor cooling structure for reducing pressure loss in ventilation ducts of a rotor.

2. Related Art

A general rotating electric machines, for example, a rotor structure of a turbine generator, is shown in FIGS. 13 to 15, in which FIG. 13 is a cross-sectional view illustrating a structure of an upper portion of a rotor core, FIG. 14 is an enlarged view illustrating a coil slot section in FIG. 13, and FIG. 15 is a longitudinal sectional view illustrating a structure of one side of a rotor in an axial direction.

With reference to FIG. 13, a plurality of coil slots 2 are provided on a rotor core 1 in a circumferential direction along an axial direction thereof, and in the coil slot 2, a rotor coil 4 is housed.

As illustrated in FIG. 13, the rotor coil 4 that is formed by laminating a plurality of field conductors 11 is housed in the coil slot 2. A rotor is formed by inserting a rotor wedge 6 in an opening end portion of the coil slot 2 and supporting the rotor coil 4. Further, as illustrated in FIG. 14, a portion of the rotor coil 4, which is protruded from an end portion of the rotor core 1 in the axial direction, is held by a support ring 9 from the outside.

Insulation materials 5 are inserted to ensure insulation of the rotor coil 4, respectively, between the rotor coil 4 and the rotor core 1, between the rotor coil 4 and the rotor wedge 6, and between the rotor coil 4 and the support ring 9. Further, although not portionicularly illustrated, the insulation materials 5 are also inserted between field conductors 11, respectively.

Furthermore, a sub-slot 3 for distributing a cooling gas 8 in the rotor axis direction is provided on a rotor inner circumferential side in the coil slot 2. In the sub-slot 3, the cooling gas 8 is distributed to cool the rotor coil 4.

As illustrated in FIG. 14, a coil ventilation duct 7 is formed to introduce the cooling gas 8 from the end portion of the rotor core 1 into the sub-slot 3 provided toward a central portion of the rotor core 1 from the end portion of the rotor core 1 and to distribute the introduced cooling gas 8 in the coil slot 2 from the side of an inner diameter to the side of an outer diameter of the rotor core 1. A channel for the cooling gas 8 for cooling the rotor coil 4 is formed by arranging the coil ventilation duct 7 along the axial direction so that the coil ventilation duct 7 passes through the rotor coil 4, the insulation materials 5, and the rotor wedge 6 in a radial direction and communicates with the sub-slots 3 provided over the entire length of the rotor core 1.

The cooling gas 8 is introduced, due to a centrifugal fan effect by the rotation of the rotor, as illustrated by arrows in FIG. 15, into the sub-slot 3 from the end portion of the rotor core 1, flows toward the central portion of the rotor core 1, and sequentially branches to the coil ventilation ducts 7.

The cooling gas 8 passing through the coil ventilation ducts 7 cools and absorbs heat generated in the rotor coil 4, and the cooling gas 8 is discharged to the side of the outer diameter of the rotor core 1 through the coil ventilation ducts 7 arranged in the rotor wedge 6.

As a cooling method of cooling the rotor coil 4 that has the sub-slots 3 for introducing the cooling gas 8, in addition to the structure illustrated in FIG. 15, various methods have been proposed. For example, Japanese Patent No. 3564915 discloses a method of dividing a coil ventilation duct into a plurality of ducts, Japanese Patent No. 3736192 discloses a method of forming an oblique opening, and Japanese Unexamined Patent Application Publication No. 7-170683 discloses a method of ventilating in an axial direction.

In the above-described rotating electric machines, an upper limit of temperature of the rotor coil 4 is strictly regulated in consideration of the heat resistance performance of the insulation materials which form the rotor coil 4. Accordingly, while current density of the rotor coil 4 increases as single capacities of recent rotating electric machines increase, in order to reduce the coil temperature to a temperature lower than the heat resistance temperature of the insulating materials 5, it is necessary to increase a diameter of the rotor, increasing a length of the core or the like so as to reduce heat volume by inserting more field conductors 11 into the coil slot 2 in the rotor.

Further, it is necessary to keep wider a ventilation area for increasing the cooling gas 8 and to increase the cooling performance, which increases the size of the generator.

In the ventilating and cooling system provided with the sub-slots 3, all cooling gas 8 in the coil ventilation duct 7 connected to the sub-slot 3 passes through in a concentrated manner in each of the sub-slots 3 from the inlet at the end portion of the rotor core 1 to the rotor coil ventilation duct 7 of the most core end side. Accordingly, the flow velocity is fast and causes large pressure loss. Then, if the duct cross-sectional area of the coil ventilation duct 7 or the number of the ducts is increased, it is impossible to ensure the ventilation amount of the cooling gas 8 for cooling the inside of the rotor coli 4.

Further, if the capacity of the rotating electric machine is increased and the length of the core of the rotating electric machine is increased, the length of the sub-slot 3 in the axial direction is increased, and pressure loss in the sun-slot 3 is also increased. Accordingly, the cooling gas 8 is hardly to flow.

Especially, in a case of an air-cooling system using air as the cooling gas 8, a heat capacity of the cooling gas 8 becomes small and temperature rise of the cooling gas 8 becomes large. Accordingly, it is necessary to keep the cooling gas 8 as much as possible.

In these systems, as a method of improving the cooling performance, like the method disclosed in the above-described Japanese Patent No. 3564915, the method of dividing the coil ventilation duct 7 into the plurality of ducts so as to extend the heat transfer area has been proposed. However, a rate of increase in the amount of the cooling gas 8 to a rate of increased area of the coil ventilation ducts 7 becomes small. Accordingly, the flow velocity in the coil ventilation ducts 7 is decreased, and the heat transfer rate is reduced, resulting in the deterioration of the cooling performance.

Furthermore, by dividing the coil ventilation duct 7 in the ducts, a flow rate distribution between the coil ventilation ducts can be easily generated, so that it is highly possible to locally increase the temperature of the rotor coil 4.

As the other methods or systems, for example, Japanese Unexamined Patent Application Publication No. 2001-178050 discloses a cross-sectional area of the flow channel of the sub-slot 3 formed to be small as approaching to the central portion of the rotor core 1 to prevent the flow rate at the central portion of the rotor core 1 from being increased more than required. In the method, temperature homogenization of the coil temperature can be achieved. However, a ventilation resistance in the sub-slot 3 is increased. Accordingly, a total amount of the cooling gas is reduced and an average temperature of the rotor coil 4 is increased.

Furthermore, there is proposed a method of increasing the ventilation amount of the cooling gas 8 by reducing inlet loss in the sub-slot 3, for example, in Japanese Unexamined Patent Application Publication No. 11-150898 and Japanese Unexamined Patent Application Publication No. 2001-258190. In these methods, there is reduced a large pressure loss generated when the cooling gas 8 flows at a large inflow angle into an opening of the sub-slot 3 which is rotating at a very high speed. For example, the inlet portion of the sub-slot 3 is formed to be a smooth R-shape such that the cooling gas is easy to flow in, or a groove for introducing the cooling gas 8 is formed on a rotor shaft 10 provided outside the end portion of the rotor core 1.

However, because of limitations in sizes of adjacent coil slots 2 or sub-slot 3, it is very difficult to turn and introduce the cooling gas 8 in the inside of the sub-slot 3 while reducing the loss at the large inflow angle, and therefore, it is difficult to expect a large pressure loss reduction effect.

SUMMARY OF THE INVENTION

The present invention was conceived in consideration of the circumstances of the prior art mentioned above, and an object of the present invention to provide a rotating electric machine particularly provided with an improved rotor therefore capable of reducing pressure loss in ventilation channels in the rotor to thereby effectively cool a rotor coil and permit a larger field current value to provide.

The above and other objects can be achieved according to the present invention.

That is, the present invention is a rotor of a rotating electric machine, comprising:

a cylindrical rotor core;

a plurality of coil slots provided on an outer periphery of the rotor core along a rotor axis direction;

rotor coils disposed in the coil slots by laminating a plurality of field conductors through an insulation material;

a rotor wedge disposed at an opening end portion of the coil slot so as to support the rotor coil;

a coil ventilation duct formed in the coil slot so as to pass through the rotor coils, the rotor wedge and the insulation material; and sub-slots provided at bottom portions of the coil slots so as to be communicated with rotor core ends and the coil ventilation ducts.

In such rotor, in one aspect, in the coil slot, the sub-slots and the coil ventilation duct constitute a cooling gas channel for distributing a cooling gas to thereby cool the rotor coils, and a depth in a diameter direction of each sub-slot from the rotor coil end to a nearest coil ventilation duct is larger than a depth of the sub-slot at a portion near a center of the rotor core.

In another aspect of the present invention, the coil slot, the sub-slots and the coil ventilation duct constitute a cooling gas channel for distributing a cooling gas to thereby cool the rotor coils, and a depth in a diameter direction of the sub-slot is gradually reduced from the coil ventilation duct disposed a nearest coil end to the coil ventilation duct at a portion near a center of the rotor core.

In a further aspect of the present invention, the coil slot, the sub-slots and the coil ventilation duct constitute a cooling gas channel for distributing a cooling gas to thereby cool the rotor coils, and an auxiliary flow channel is provided in at least one side of the sub-slot along the rotor axis direction and an auxiliary communication channel, which communicates the auxiliary flow channel and the sub-slot at least one point, is provided.

In a still further aspect of the present invention, the coil slot, the sub-slots and the coil ventilation duct constitute a cooling gas channel for distributing a cooling gas to thereby cool the rotor coils, and in a range from the rotor core end to a position of the coil ventilation duct positioned nearest from the rotor coil end, the sub-slots are formed so that a width of the slot is larger than that at a position of another coil ventilation duct.

The present invention further provides a rotating electric machine provided with the rotor of the structures mentioned above.

According to the above aspects of the present invention of the characteristic structures mentioned above, it is possible to provide a rotor of a rotating electric machine, which can reduce pressure loss in ventilation channels in the rotor, effectively cool a rotor coil, and allow a larger field current value.

The nature and further characteristic features of the present invention will be made clearer from the following descriptions made with reference to the accompanying drawings.

DESCRIPTION OF THE PREFERRED EMBODIMENTS

Figure 13:
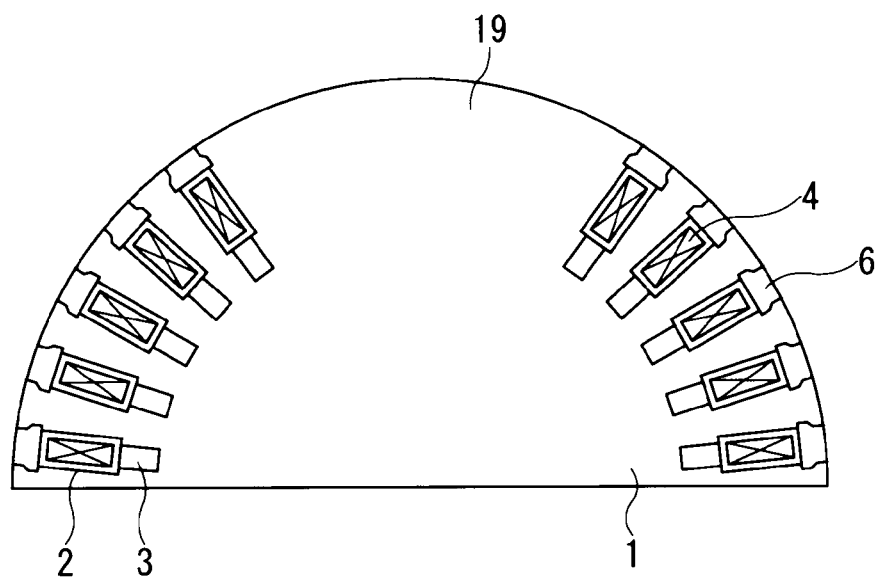
FIG. 13 is a cross-sectional view illustrating a structure of an upper portion of a rotor core of a known rotating electric machine.
Figure 14:
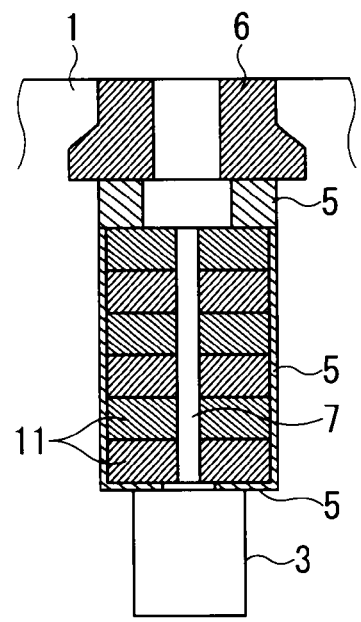
FIG. 14 is an enlarged view illustrating a coil slot section in FIG. 13.
Figure 15:
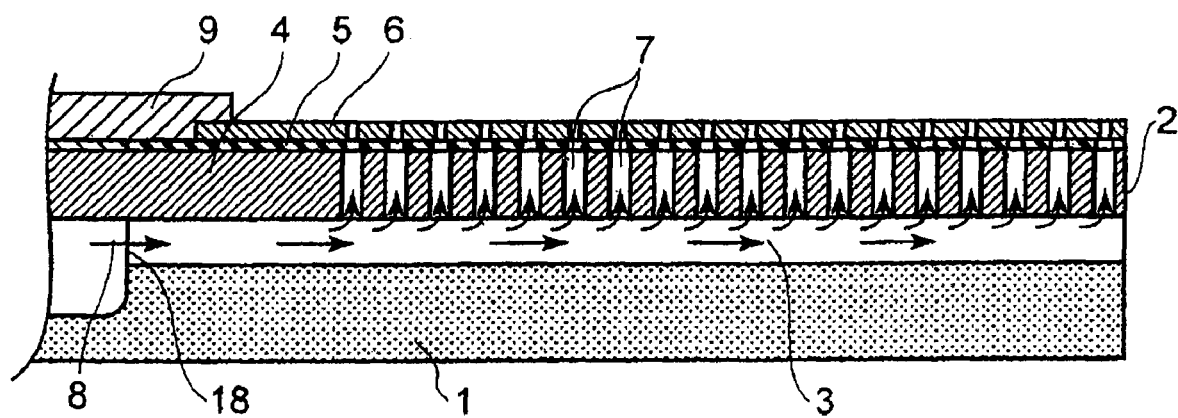
FIG. 15 is a longitudinal sectional view illustrating a structure of a one side of a known rotor in an axial direction.

Hereinafter, embodiments of a rotor of a rotating electric machine will be described with reference to the accompanying drawings, in which the same reference numerals are added to portions or elements corresponding to those shown in FIGS. 13 to 15 as prior art.

First Embodiment

Figure 1:
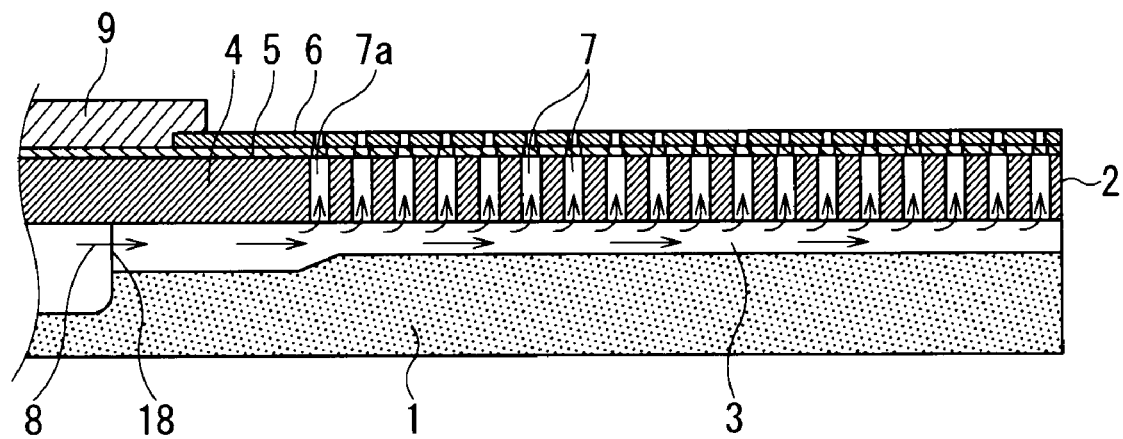
FIG. 1 is a longitudinal sectional view illustrating a structure of one side of a rotor of a rotating electric machine in an axial direction according to a first embodiment of the present invention.

FIG. 1 is a longitudinal sectional view illustrating a structure of one side of a rotor of a rotating electric machine in an axial direction according to a first embodiment of the present invention.

With reference to FIG. 1, a plurality of coil slots 2 are provided to a rotor core 1 in a circumferential direction, and in the coil slot 2, a rotor coil 4 is housed.

Each of the rotor coil 4 is formed by laminating a plurality of field conductors 11. The rotor coil 4 is held by inserting the rotor wedge 6 in an opening end portion of the coil slot 2. Further, the most outside rotor coil 4 that protrudes from the rotor core 1 is held by the ring-shaped support ring 9 from the outside.

A sub-slot 3 is provided on a rotor inner circumferential side in the coil slot 2 along the axial direction of the rotor core 1. In the sub-slot 3, the cooling gas 8 is distributed to cool Joule heat generated by the rotor coil 4.

Further, in the rotor coil 4, a plurality of coil ventilation ducts 7 are provided in the direction of the radius of the rotor core 1 such that the coil ventilation ducts 7 pass through the rotor coil 4, the insulation materials 5 and the rotor wedge 6. The coil ventilation ducts 7 are formed to communicate with the sub-slots 3 provided along the entire length of the rotor core 1 and to cool the rotor coil 4 by distributing the cooling gas 8 introduced in the sub-slots 3 in the coil ventilation ducts 7.

In the first embodiment, the sub-slot 3 is formed such that a depth of the sub-slot 3 from a rotor core end 18 to a rotor coil ventilation duct 7a of the most core end side is deeper than that of the sub-slot 3 near the center of the rotor core 1.

In the first embodiment, the sub-slot 3 is formed as described above, and accordingly, the cooling gas 8 is introduced, due to the centrifugal fan effect by rotation of the rotor, into the sub-slot 3 from the rotor core end 18, flows toward the central portion of the rotor core 1, and sequentially branches to the coil ventilation ducts 7. The cooling gas 8 passing through the coil ventilation ducts 7 cools and absorbs the heat generated in the rotor coil 4, and is discharged from the outer diameter side of the rotor core 1 through the coil ventilation ducts 7.

In the sub-slot 3 disposed from the rotor core end 18 to the rotor coil ventilation duct 7a of the outermost core end side, all cooling gas 8 passes through in a concentrated manner. However, since the sub-slot 3 is formed such that the flow channel area of this portion is maximized, much amount of cooling gas 8 can be distributed.

The centrifugal fan effect by the rotation of the rotor is substantially determined by a difference between the outer diameter of the rotor core 1 and the position of the radius of the sub-slot 3. The amount of the airflow in the rotor is determined such that pressure loss in the rotor balances with the difference. Generally, since the pressure loss varies in proportion to squared flow velocity, as pressure loss at a portion having the fastest flow velocity is reduced, a more improved effect can be obtained.

In the structure illustrated in FIG. 1, from the sub-slot 3, eighteen coil ventilation ducts are branched. In the rotating electric machine, generally, as capacities are increased, core lengths are increased and the number of the coil ventilation ducts is increased. Then, the sum of the flow channel areas of the coil ventilation ducts becomes larger than the sub-slot areas. Accordingly, the portion having the fastest flow velocity in the ventilation channels of the rotor constitutes the sub-slot disposed from the rotor core end 18 to the rotor coil ventilation duct 7a of the most core end side on which the all cooling gas 8 is concentrated.

In the rotor of the rotating electric machine according to the first embodiment, by increasing the flow channel area of the portion at which the cooling gas flows at the fastest flow velocity, the pressure loss can be effectively decreased and much amount of the cooling gas can flow in. Accordingly, the rotor of the rotating electric machine effectively cooling the rotor coil to permit a larger field current value to provide can be realized.

In the first embodiment, the cross-sectional area of the sub-slot is changed by varying the depth of the sub-slot 3. However, a width of the sub-slot 3 may be varied, or both of the depth and width may be varied. Further, in the first embodiment, the depth of the sub-slot from the rotor core end 18 to the rotor coil ventilation duct 7a of the most core end side is formed to be the same depth. However, the depth may be varied partially or in a plurality of stages from the rotor core end 18, or may be continuously varied.

Figure 2:
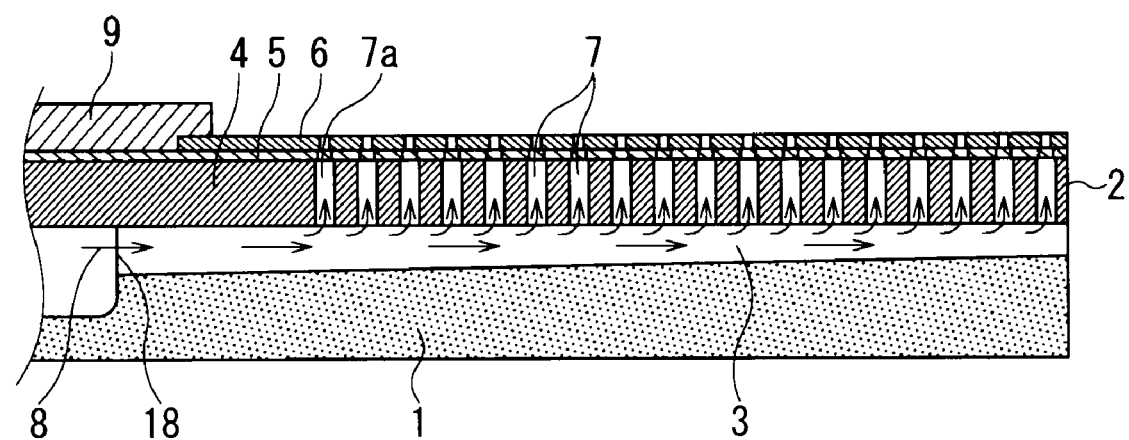
FIG. 2 is a longitudinal sectional view illustrating a modification of the rotor of the rotating electric machine according to the first embodiment of the present invention.

Furthermore, as shown in FIG. 2, the cross-sectional area of the sub-slot 3 near the center of the rotor core 1 may be continuously reduced toward the center of the rotor core. In addition, the width of the sub-slot 3 may be formed to narrow at the rotor core inner diameter side.

Second Embodiment

A second embodiment of the present invention will be described with reference to FIG. 3. The same or like reference numerals are added to components similar to those in the first embodiment, and their descriptions are omitted.

Figure 3:
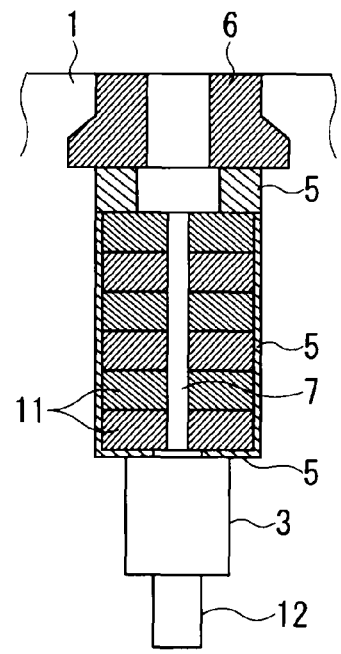
FIG. 3 is an enlarged cross-sectional view illustrating a coil slot section of a rotor of a rotating electric machine according to a second embodiment of the present invention.

FIG. 3 is an enlarged cross-sectional view illustrating a coil slot section of a rotor of a rotating electric machine according to a second embodiment of the present invention. In FIG. 3, the rotor coil 4 that is formed by laminating the field conductors 11 is housed in the coil slot 2 through the insulation materials 5. The rotor coil 4 is fixed in the coil slot 2 by inserting the rotor wedge 6 at the outer diameter side thereof. In the insulation materials 5, the rotor coil 4 and the rotor wedge 6, the coil ventilation duct 7 communicating in the radial direction of the coil slot 2 is formed so as to pass through in the axial direction of the rotor coil 1.

On the inner diameter side of the coil slot 2, the sub-slot 3 is provided, and an auxiliary slot 12 that has a width smaller than that of the sub-slot 3 is provided along the axial direction of the rotor core 1. The sub-slot 3 and the auxiliary slot 12 are formed to pass through the rotor core 1 and communicate with the coil ventilation duct 7.

In the second embodiment, the cross-sectional area of the flow channels for the cooling gas 8 in the rotor core 1 is increased by forming the auxiliary slot 12 on the inner diameter side of the sub-slot 3. Accordingly, as compared with the structure of the first embodiment, much amount of the gas can pass through, and the rotor of the rotating electric machine, permitting a larger field current value to provide, can be disposed.

Generally, the coil slot 2 is designed so as to have a maximum size to a possible limit of its mechanical strength. Accordingly, if it is simply tried to extend or expand the depth or the width of the sub-slot 3, it is often difficult to extend the size or width due to shortage in the mechanical strength. However, in the second embodiment, by providing the auxiliary slot 12 having a width smaller than that of the sub-slot 3 on the inner diameter side of the sub-slot 3, the cross-sectional area of the flow channel for the cooling gas 8 can be extended without mechanical strength shortage.

In FIG. 3, the auxiliary slot 12 has a constant width. However, the auxiliary slot 12 may be formed to have a width widened from the inner diameter side toward the outer diameter side.

Figure 4:
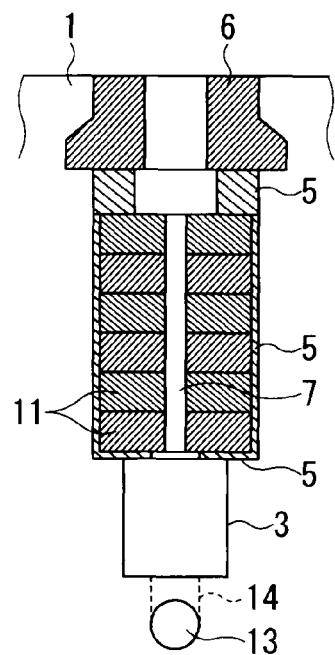
FIG. 4 is an enlarged cross-sectional view illustrating a coil slot section of a modified rotor for the rotating electric machine according to the second embodiment of the present invention.

In the second embodiment, the sub-slot 3 and the auxiliary slot 12 are communicated with each other over the entire surface in the axial direction of the rotor core 1. However, as illustrated in FIG. 4, an auxiliary flow channel 13 may be formed along the axial direction with a space from a bottom surface of the sub-slot 3, and an auxiliary communication channel 14, which is communicated with the sub-slot 3 at a portion in the axial direction of the auxiliary flow channel 13, may be provided, thereby obtaining a substantially similar effect.

Third Embodiment

A third embodiment of the present invention will be described with reference to FIG. 5. The like or same reference numerals are added to components corresponding to those in the above-described first and second embodiments, and their descriptions are omitted herein.

Figure 5:
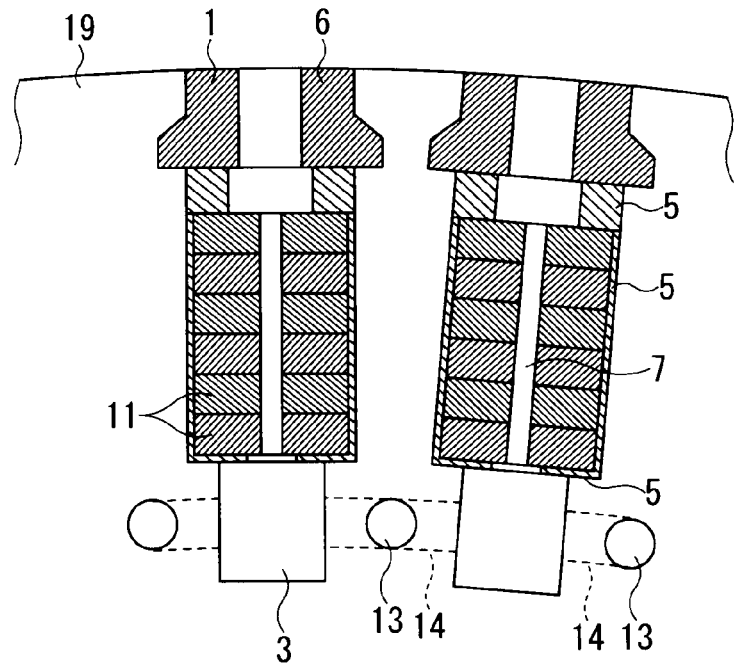
FIG. 5 is a cross-sectional view illustrating a structure near a coil slot section in a rotor of a rotating electric machine according to a third embodiment of the present invention.

FIG. 5 is a cross-sectional view illustrating a structure of a portion near a coil slot section in a rotor of a rotating electric machine according to the third embodiment of the present invention.

In the third embodiment, the auxiliary flow channels 13 are provided between the adjacent sub-slots 3 provided in the circumference direction of the rotor core 1 and a magnetic pole portion 19 of the rotor core 1 so as to extend along the axial direction of the rotor core 1. Further, at a portion of the auxiliary flow channel in the axial direction, the auxiliary communication channel 14 communicating with the sub-slots 3 is provided. The other structures are similar to those shown in FIG. 1.

In the third embodiment, the auxiliary flow channels 13 are disposed between the adjacent sub-slots 3 disposed in the circumferential direction and the magnetic pole section 19. This third embodiment can attain substantially the same effects and advantages as those of the second embodiment represented by FIG. 4.

In FIG. 5, although the auxiliary flow channels 13 are disposed at the side surfaces of the sub-slots 3, they may be disposed on the inner diameter side than the sub-slots 3.

Fourth Embodiment

A fourth embodiment of the present invention will be described hereunder with reference to FIG. 6. The same reference numerals are added to components corresponding to those in the above-described embodiments, and the duplicated descriptions are omitted herein.

Figure 6:
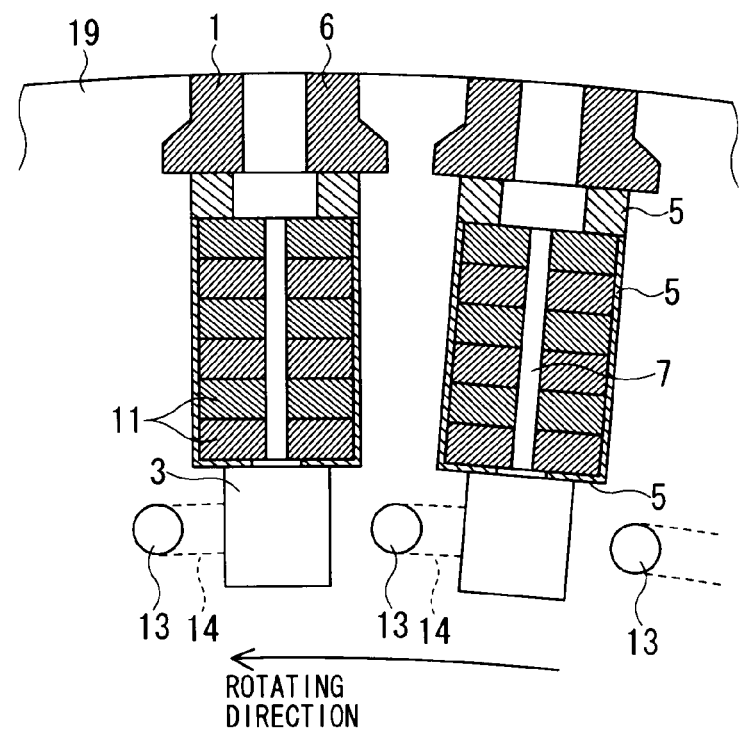
FIG. 6 is a cross-sectional view illustrating a structure near a coil slot section in a rotor of a rotating electric machine according to a fourth embodiment of the present invention.

FIG. 6 is a cross-sectional view illustrating a structure of a portion near a coil slot section in a rotor of a rotating electric machine according to the fourth embodiment of the present invention.

In FIG. 6, the auxiliary flow channels 13 are provided between the adjacent sub-slots 3 disposed in the circumference direction of the rotor core 1 and the magnetic pole section 19. Further, the auxiliary communication channels 14 are provided so as to communicate with only the sub-slots 3 positioned on a rotating direction lagging side of the rotor. The other structures are similar to those in the third embodiment illustrated in FIG. 5.

As mentioned, in this fourth embodiment, the auxiliary communication channels 14 are provided so as to communicate with only the sub-slots 3, so that the cooling gas 8 introduced into the auxiliary flow channels 13 flows in a direction opposite to the rotating direction of the rotor. Thus, pressure loss at the time of merging of the cooling gas 8 from the auxiliary flow channels 13 through the auxiliary communication channels 14 and the cooling gas 8 in the sub-slots 3 can be reduced. Accordingly, the rotor of the rotating electric machine, which can effectively cool the rotor coil 4 and permits a larger field current value to provide, can be provided.

Fifth Embodiment

A fifth embodiment of the present invention will be described hereunder with reference to FIGS. 7 and 8. The same or like reference numerals are added to components corresponding to those in the above-described embodiments, and the duplicated descriptions are omitted herein.

Figure 7:
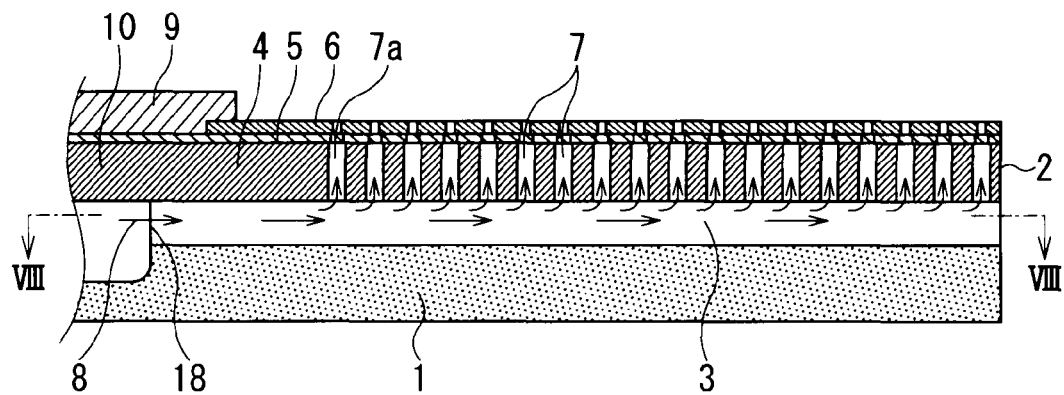
FIG. 7 is a longitudinal sectional view illustrating a structure of one side of a rotor of a rotating electric machine in an axial direction according to a fifth embodiment of the present invention.

FIG. 7 is a longitudinal sectional view illustrating a structure of one side of a rotor of a rotating electric machine in an axial direction according to the fifth embodiment of the present invention. FIG. 8 is a sectional view taken along the line VIII-VIII of FIG. 7.

Figure 8:
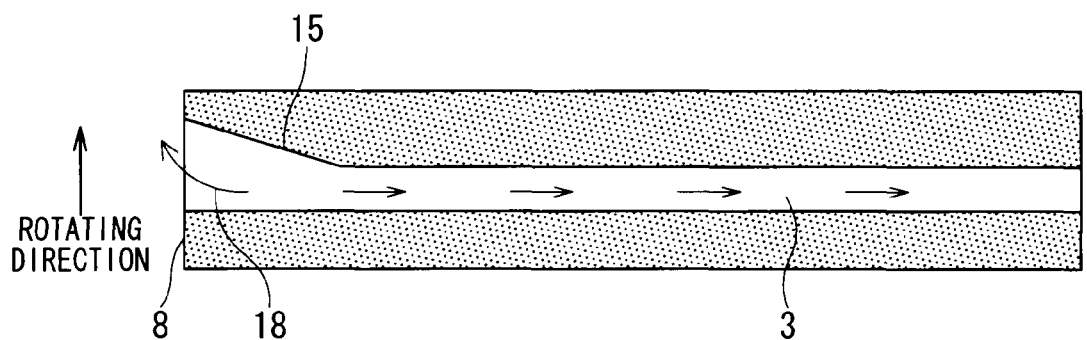
FIG. 8 is a sectional view taken along the line VIII-VIII of FIG. 7.

In FIG. 8, a notch (cutout) 15 is provided at a rotor core end portion on a rotating direction leading side of the rotor with respect to the sub-slot 3 that is provided on the inner diameter side of the coil slot 2 of the rotor core 1 at an opening portion at the rotor core end 18 side. The cross-sectional area of the sub-slot 3 becomes large by the formation of the notch 15 at the rotor core end 18 side.

On the inlet side of the sub-slot 3 at the rotor core end 18, the cooling gas 8 flows in at a large inflow angle by the rotation of the rotor. Accordingly, a flow velocity distribution that is deflected to the rotating direction lagging side is generated at the respective channel inlets. In the fifth embodiment, by notching a corner portion at the rotation direction leading side of the rotor, the cooling gas 8 becomes easier to flow in, and further, the flow channel areas of each channel can be expanded, so that the pressure loss at that portion can be reduced, and the rotor of the rotating electric machine, which can effectively cool the rotor coil 4 and permits a larger field current value to provide, can be provided.

Figure 9:
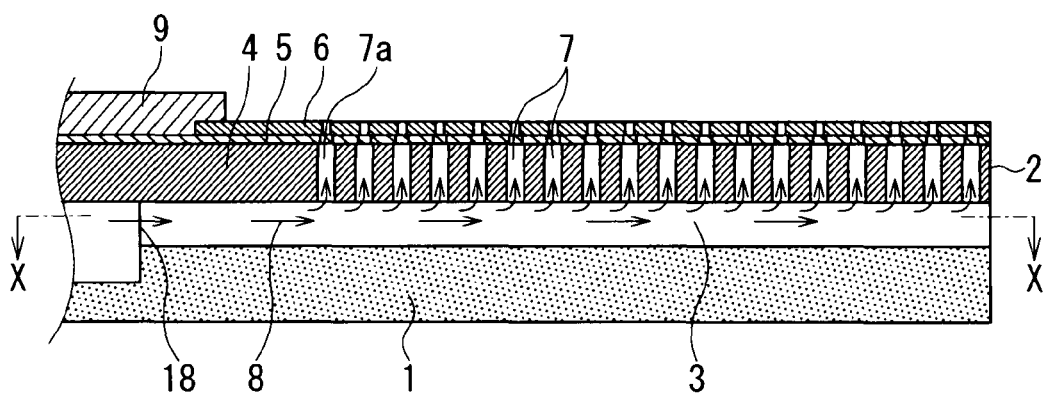
FIG. 9 is a longitudinal sectional view illustrating a structure of one side of a rotor of a rotating electric machine in an axial direction according to a modification of the fifth embodiment of the present invention.
Figure 10:
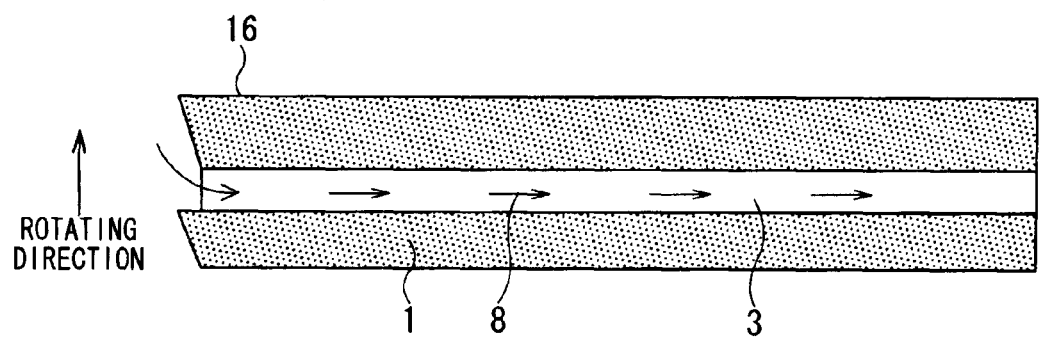
FIG. 10 is a sectional view taken along the line X-X of FIG. 9.

In the fifth embodiment, the notch 15 is provided at the opening portion on the rotor core end 18 side so as to increase the cross-sectional area at the rotor core end 18 side of the sub-slot 3. However, as illustrated in FIG. 9 and FIG. 10 that is a sectional view taken along the line X-X of FIG. 9, a protrusion portion 16 may be provided at the rotor core end 18 on the rotating direction lagging side of the rotor at an opening of the sub-slot 3.

Sixth Embodiment

A sixth embodiment of the present invention will be described hereunder with reference to FIGS. 11 and 12. The same or like reference numerals are added to components corresponding to those in the above-described embodiments, and the duplicated descriptions are omitted herein.

Figure 11:
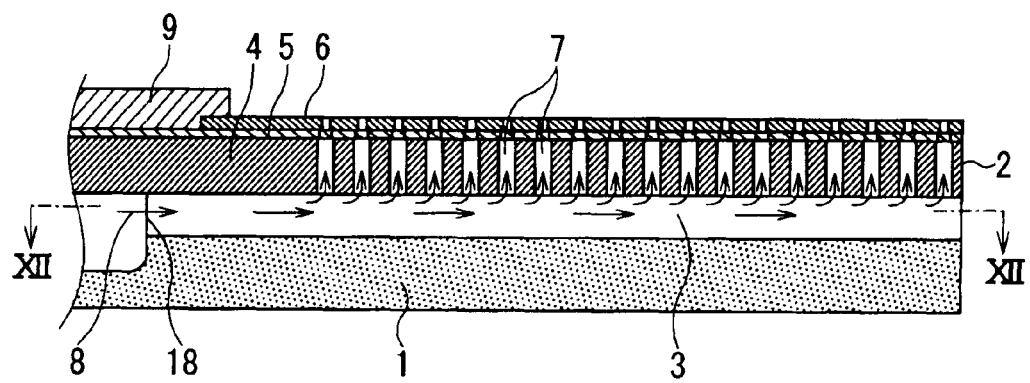
FIG. 11 is a longitudinal sectional view illustrating a structure of one side of a rotor of a rotating electric machine in an axial direction according to a sixth embodiment of the present invention.
Figure 12:
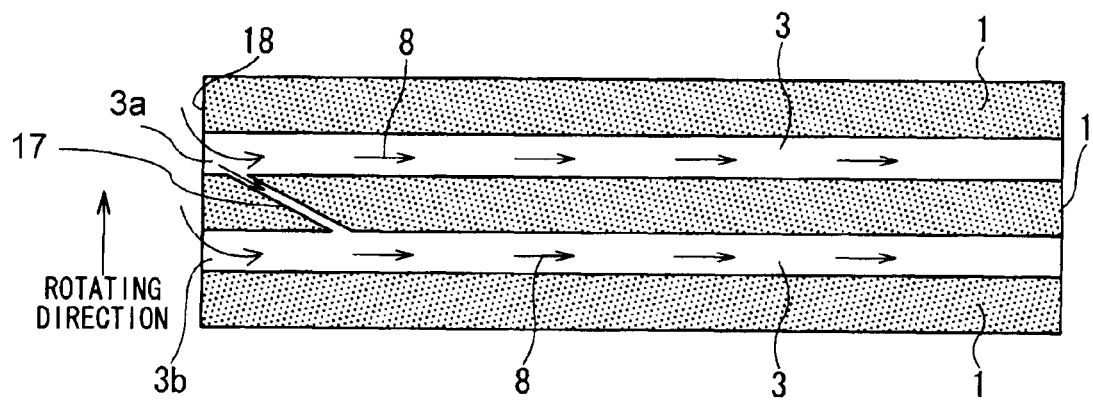
FIG. 12 is a sectional view taken along the line XII-XII of FIG. 11.

FIG. 11 is a longitudinal sectional view illustrating a structure of one side of a rotor of a rotating electric machine in an axial direction according to the sixth embodiment of the present invention. FIG. 12 is a sectional view taken along the line XII-XII of FIG. 11. In the sixth embodiment, as illustrated in FIG. 12, an auxiliary communication channel 17 that communicates with the sub-slot 3a on the rotation direction leading side of the rotor to the sub-slot 3b at the lagging side is formed to the adjacent sub-slots 3.

At portions around the inlets of the sub-slots 3 at the rotor core end 18, the cooling gas 8 flows in at a large inflow angle by the rotation of the rotor. Accordingly, at each channel inlet, a flow velocity distribution that is deflected to the rotation direction lagging side is generated. In the sixth embodiment, by providing the auxiliary communication channel 17 communicating with the sub-slot 3a on the rotating direction leading side of the rotor with respect to the sub-slot 3b, the cooling gas 8 flowing in the sub-slot 3a at the rotation direction leading side of the rotor passes through the auxiliary communication channel 17 and becomes easier to flow in the sub-slot 3b on the lagging side. Accordingly, the pressure loss can be reduced, and the rotor of the rotating electric machine, which can effectively cool the rotor coil 4 and permits a larger field current value, can be provided.

In the forgoing descriptions, although various embodiments of the rotor of the rotating electric machine, these rotors may be preferably applicable to rotating electric machines which have constitutional elements other than the rotors in the ordinal arrangements, and accordingly, such rotating electric machines are also within the scope of the present invention.

It is to be noted that the present invention is not limited to the described embodiments and many other changes and modifications may be made without departing from the scopes of the appended claims.

What is claimed is:

1. A rotor of a rotating electric machine, comprising:
   a cylindrical rotor core;
   a plurality of coil slots provided on an outer periphery of the rotor core along a rotor axis direction;
   rotor coils disposed in the coil slots by laminating a plurality of field conductors through an insulation material;
   a rotor wedge disposed at an opening end portion of the coil slots so as to support the rotor coils;
   a coil ventilation duct formed in the coil slots so as to pass through the rotor coils, the rotor wedge and the insulation material; and
   sub-slots provided at bottom portions of the coil slots so as to be communicated with rotor core ends and the coil ventilation ducts,
   wherein the coil slots, the sub-slots and the coil ventilation duct constitute a cooling gas channel for distributing a cooling gas to thereby cool the rotor coils, and a depth in a diameter direction of each sub-slot from the rotor coil end to a nearest coil ventilation duct is larger than a depth of the sub-slot at a portion near a center of the rotor core, and the sub-slots are provided on a rotor inner circumferential side in the coil slots along the axial direction of the rotor core.

2. The rotor of the rotating electric machine according to claim 1, wherein a depth in a diameter direction of a sub-slot is gradually reduced from the coil ventilation duct disposed at a nearest coil end to the coil ventilation duct at a portion near a center of the rotor core.

3. The rotor of the rotating electric machine according to claim 1, further comprising an auxiliary flow channel, which is not communicated with a sub-slot, formed along a rotor core axis direction and an auxiliary communication channel, which is communicated with at least one of the sub-slots, formed to the auxiliary flow channel.

4. The rotor of the rotating electric machine according to claim 3, wherein an auxiliary flow channel is provided in at least one side of a sub-slot along the rotor core axis direction and an auxiliary communication channel, which communicates the auxiliary flow channel and the sub-slot at least one point, is provided.

5. The rotor of the rotating electric machine according to claim 4, wherein the auxiliary communication channel is communicated with only a sub-slot located on a rotating direction lagging side.

6. The rotor of the rotating electric machine according to claim 1, wherein a protrusion extending from a rotating direction leading side to a lagging side is formed with respect to the rotor core located at a width direction side surface of a rotor core end opening portion of a sub-slot.

7. The rotor of the rotating electric machine according to claim 1, wherein an auxiliary communication channel is provided for introducing the cooling gas from a sub-slot located on a rotating direction lagging side with respect to a sub-slot located on a rotating direction leading side.

8. The rotor of the rotating electric machine according to claim 1,
   wherein the sub-slots are formed, in a range at least from a rotor core end to a position of the nearest coil ventilation duct, so as to make a wider slot width on the rotor core outer diameter side than that on the rotor core inner diameter side.

9. A rotating electric machine including the rotor according to any one of claims 1 to 8.

* * * * *